United States Patent
Akita et al.

(10) Patent No.: US 6,170,620 B1
(45) Date of Patent: Jan. 9, 2001

(54) DISC BRAKE AND ANTI-SQUEAL SHIM THEREFOR

(75) Inventors: Hiroaki Akita, Gotenba; Toyotaka Fukawa, Shizuoka-ken, both of (JP)

(73) Assignee: U-Sun Gasket Corporation, Shizuoka-Ken (JP)

(*) Notice: Under 35 U.S.C. 154(b), the term of this patent shall be extended for 0 days.

(21) Appl. No.: 09/177,125

(22) Filed: Oct. 22, 1998

(30) Foreign Application Priority Data

Jul. 21, 1998 (JP) .................................................. 10-205099

(51) Int. Cl.[7] .................................................. F16D 69/00
(52) U.S. Cl. .................................... 188/251 A; 188/73.37
(58) Field of Search .......................... 188/257, 251 A, 188/73.36, 73.37, 258, 250 E; 192/30 V, 107 M

(56) References Cited

U.S. PATENT DOCUMENTS

| | | | |
|---|---|---|---|
| 3,684,062 | * 8/1972 | Johnson | 188/251 R |
| 4,330,442 | * 5/1982 | Lindeman et al. | 524/16 |
| 4,523,668 | * 6/1985 | Uematsu et al. | 192/107 M |
| 5,509,508 | * 4/1996 | Evans | 188/73.38 |
| 5,842,546 | * 12/1998 | Biswas | 188/73.37 |
| 5,975,252 | * 11/1999 | Suzuki et al. | 188/73.1 |

FOREIGN PATENT DOCUMENTS 63-101530  5/1988  (JP).

* cited by examiner

Primary Examiner—Matthew C. Graham
Assistant Examiner—Xuan Lan Nguyen
(74) Attorney, Agent, or Firm—Birch, Stewart, Kolasch & Birch, LLP

(57) ABSTRACT

An anti-squeal shim comprises a metal plate and a compound layer applied to at least one side of the metal plate. The compound includes a nonmetal fiber other than asbestos, an elastomer, a filler and small pieces of cork. The anti-squeal shim is disposed between a forcing member that urges a friction pad against a disc rotor and a backing plate of the friction pad in a disc brake. Also disclosed is a disc brake where only one side of the metal plate of the anti-squeal shim is coated with the compound layer and the anti-squeal shim is opposed to the forcing member without intervention of a backing-up shim.

11 Claims, 3 Drawing Sheets

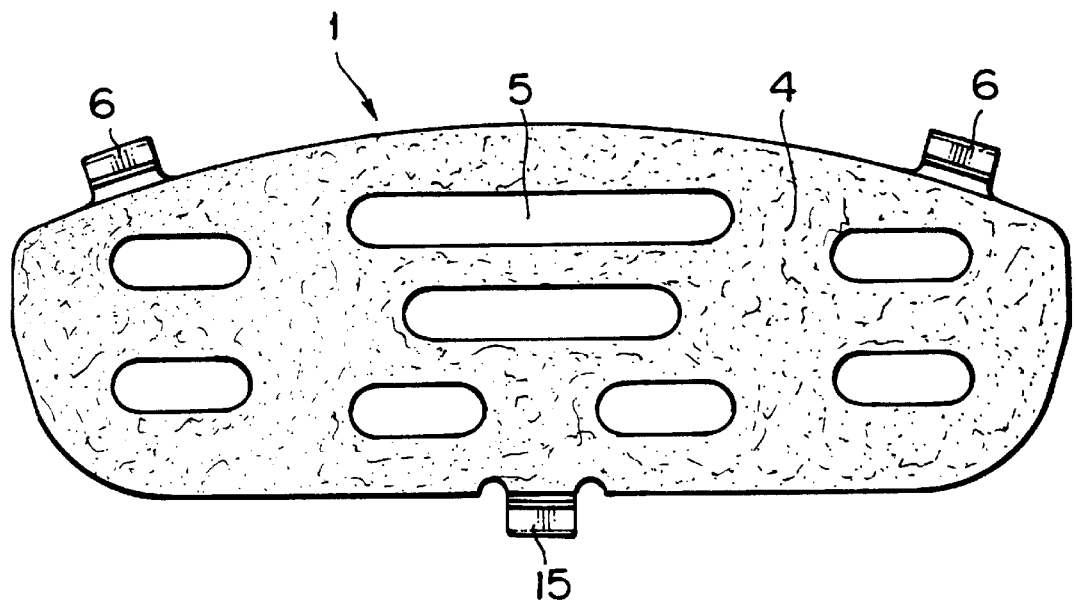
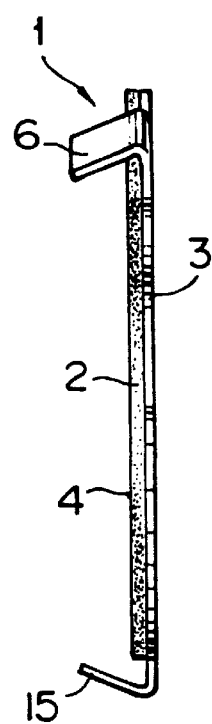

DISC BRAKE AND ANTI-SQUEAL SHIM THEREFOR

BACKGROUND OF THE INVENTION

1. Field of the Invention

This invention relates to a disc brake, and more particularly to an anti-squeal shim structure therein for eliminating "brake squeal" and for heat insulation.

2. Related art

A disc brake generally includes a disc rotor rotating with a wheel of an automotive vehicle, a pair of friction pads each having a backing plate and a friction member secured to the disc rotor side of the backing plate, a caliper secured to a support member of the vehicle and supporting the friction pads movably toward and away from opposite friction surfaces of the disc rotor, and hydraulic actuating means such as a hydraulic cylinder urging the friction pads through forcing members such as a brake piston and a finger of the caliper against the friction surfaces of the disc rotor to restrain a rotation of the disc rotor.

With such a construction, a disc brake may under some conditions emit squealing noise in operation. This brake squeal noise is considered to be caused by relative displacements between the backing plates of the friction pads and the forcing members and by vibrations due to interactions between the friction pads and the disc rotor when the friction pads are urged against the disc rotor.

To reduce or eliminate such brake squeal noise, generally anti-squeal shims each made of a steel plate with damping material layers applied to both faces thereof have been interposed between the friction pads and the forcing members. In most cases, each damping material layer of the anti-squeal shims is formed of a layer consisting solely of a synthetic rubber of about 100 microns thick, the surface of which layer further being coated with a graphite layer to decrease the coefficient of friction.

However, the conventional anti-squeal shim with the rubber only layer suffers from the following shortcomings. Satisfactory vibration damping properties cannot be obtained, and thereby the brake squeal cannot be prevented satisfactorily. When the anti-squeal shim is urged against the caliper, a lateral flow is occurred in the rubber layer thereof and the layer is apt to come off. Since the heat resisting temperature of the rubber layer is low, usually about 150° C., the frictional heat produced between the friction pad and the disc rotor and transmitted to the anti-squeal shim through the friction pad ages and rags the rubber layer in a relatively short period of time. Therefore, the conventional anti-squeal shim is not durable, and thereby the effect of reducing the brake squeal is further deteriorated in a relatively short period of time.

The present inventor has disclosed another type of anti-squeal shim, in Japanese Patent Laying-open Publication No. Showa 63-101530, wherein the damping material layers applied to the both sides of a metal plate are formed of a compound including a heat resistant nonmetal fiber other than asbestos, an elastomer and a filler. According to this anti-squeal shim, the effect of reducing the brake squeal can be heightened, there is little danger of a lateral flow occurring in the damping material layers, or the compound layers, and the heat resisting temperature of the compound layers is high, thus the anti-squeal shim is durable and can keep the effect of reducing the brake squeal stably in a long period of time. In addition, the anti-squeal shim has a good heat insulation property and reduces the heat transfer from the friction pad to the brake fluid in the hydraulic system therethrough, improving the reliability of the hydraulic system of the brake apparatus.

However, the anti-squeal shim with the compound layers presents problems discussed hereinafter. The greater the percentage of the heat resisting nonmetal fiber and the filler in the compound is, the higher become the effect of reducing the brake squeal and the heat insulation property of the anti-squeal shim. The reason for it appears to be that the greater the percentage of the nonmetal fiber and the filler in the compound is, the more the compound has voids therein. However, as the percentage of the nonmetal fiber and the filler is increased in the compound to improve the effect of reducing the brake squeal noise and the heat insulation property, the percentage of the elastomer is inversely decreased, causing the bonding strength between the nonmetal fiber and the elastomer in the compound to be decreased. As a result, separations between the elastomer and the nonmetal fiber are apt to occur in the compound layer during a punching process or the like in the manufacturing process of the anti-squeal shim.

On the other hand, in a disc brake, generally, the contact area between the anti-squeal shim and the forcing member such as a brake piston or a finger of the caliper is relatively small. For example, generally the brake piston is hollow with a thin wall shell with the open end thereof opposed to the anti-squeal shim, and thereby the contact area between the anti-squeal shim and the piston forms a ring shape. Accordingly, in case of the conventional anti-squeal shim wherein both faces thereof are coated with the damping material layers, if the anti-squeal shim and the forcing member are directly opposed to each other, an extremely high pressure will be partially applied to the damping material layer on the side of the forcing member. To obviate the above-mentioned disadvantage, another shim, so-called "backing-up shim", has heretofore been interposed between the anti-squeal shim and the forcing member.

However, the disc brake apparatus equipped with the backing-up shim has the following deficiencies.

(a) Numbers of parts as well as manufacturing costs are increased.

(b) Even if the anti-squeal shim is provided with holes therethrough or recesses at the periphery thereof to improve the heat insulating effect, the desired effect cannot be produced because the backing-up shim covers the holes or recesses.

SUMMARY OF THE INVENTION

It is accordingly a principal object of the present invention to provide a disc brake and anti-squeal shim therefor which can improve the effect of reducing the brake squeal and the heat insulation property.

It is another object of the present invention to provide a disc brake and anti-squeal shim therefor which can obviate the separations between the elastomer and the nonmetal fiber in the damping material layer, or compound layer.

It is a further object of the present invention to provide a disc brake and anti-squeal shim therefor which can dispense with a backing-up shim.

An anti-squeal shim in accordance with the present invention comprises a metal plate and a compound layer applied at least to one side of the metal plate. The compound includes a nonmetal fiber other than asbestos, an elastomer, a filler and small pieces, or grains or particles, of cork. The compound may be applied either only to one side of the metal plate or the both sides of the metal plate.

Cork has numerous closed cells disposed throughout its mass. Each of the cells contains air, which generally occupies 50% of the total volume of cork. Accordingly, in the present invention, voids in the compound can be increased by addition of the small pieces of cork to the compound without increasing the percentage of the fiber and the filler. As a result, the effect of reducing the brake squeal and the heat insulation property can be considerably improved and yet separations between the elastomer and the nonmetal fiber in the compound layer can be obviated.

In a particular aspect of the present invention, the compound layer is applied only to one side of the metal plate.

According to a disc brake provided by the present invention, a pair of friction pads are positioned on opposite sides of a disc rotor rotating with a wheel of an automotive vehicle so as to be movable toward and away from the opposite sides of the disc rotor. Each of the friction pads has a backing plate and a friction member secured to the disc rotor side of the backing plate. A hydraulic actuating means is provided to urge the friction pads through forcing members against the opposite sides of the disc rotor to restrain a rotation of the disc rotor. An anti-squeal shim including a metal plate and a compound layer applied only to one side of the metal plate is also provided. The compound includes a nonmetal fiber other than asbestos, an elastomer, a filler and small pieces of cork. The anti-squeal shim is interposed between the forcing member and the backing plate with the metal plate opposed to the forcing member without intervention of a backing-up shim and with the compound layer opposed to the backing plate.

When a metal plate is coated with a layer of a rubber only, a thickness of the rubber layer should be less than about 100 microns, because the thicker the rubber layer is, the more it is liable to present stress relaxation or setting. Therefore, in the event that the metal plate is coated only on one face thereof with a rubber layer alone, satisfactory vibration damping properties cannot be obtained and thereby the brake squeal cannot be prevented effectively.

According to the present invention, however, since the metal plate is coated with a layer of a compound including a nonmetal fiber other than asbestos, an elastomer, a filler and small pieces of cork, the stress relaxation or setting is hard to occur even if the compound layer is thickened up to 800 microns. Consequently, even with the metal plate coated only on one face thereof with the compound layer, satisfactory vibration damping properties can be obtained and thereby the brake squeal can be prevented effectively. Therefore, it is not necessary to coat the forcing member side face of the metal plate with the compound layer, and thereby the backing-up shim is not necessary.

Besides, since the compound layer has an excellent heat insulating property due to the small pieces of cork dispersed thereinto, as previously stated, the heat transfer from the friction pad to the brake fluid in the hydraulic system through the anti-squeal shim is decreased, and thereby the reliability of the hydraulic system of the disc brake is improved.

Moreover, since a backing-up shim is not necessary, when the anti-squeal shim is provided with holes therethrough or recesses at the periphery thereof, they are not closed by the backing-up shim and are allowed to limit the heat conduction paths in the disc brake. At the same time, the holes or recesses form air passages which are open to the contact area between the anti-squeal shim and the forcing member such as a brake piston or a finger of a caliper, causing air flows therethrough to allow efficient heat radiation. Consequently, the heat insulating effect is more improved and heat transfer to the brake fluid in the hydraulic system is more decreased.

BRIEF DESCRIPTION OF THE DRAWINGS

FIG. 1 is a front elevation view of an anti-squeal shim in one embodiment of the present invention.

FIG. 2 is an enlarged side elevation view of the anti-squeal shim.

DETAILED DESCRIPTION OF THE INVENTION

Figure 3:
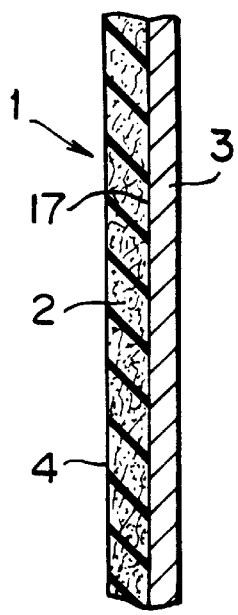
FIG. 3 is an enlarged cross sectional view of a part of the anti-squeal shim.

In the present invention, preferably the plate that constitutes the anti-squeal shim is a stainless steel plate or a steel plate.

The nonmetal fiber other than asbestos in the compound of the present invention may be an inorganic fiber, organic fiber or a mixture of them. However, in the event that the nonmetal fiber of the compound is formed only of an inorganic fiber other than asbestos, the vibration damping properties of the compound layer will be deteriorated, because an inorganic fiber generally lacks softness. On the other hand, in the event that the nonmetal fiber of the compound is formed solely of an organic fiber, the heat resisting properties of the anti-squeal shim will be deteriorated, because an organic fiber generally has inferior heat resisting properties. Therefore, it is preferable to incorporate both an inorganic fiber and an organic fiber in mixture.

Inorganic fibers for the compound of the present invention may be a glass fiber, ceramic fiber, rock wool, mineral wool, fused quartz fiber, chemical processed high silica fiber, fused alumina silicate fiber, alumina continuous fiber, stabilized zirconia fiber, boron nitride fiber, alkali titanate fiber, whiskers, boron fiber, or the like.

Organic fibers for the compound of the present invention may be aramid fibers (aromatic polyamide fibers), polyamide fibers other than aramid fibers, polyolefine fibers, polyester fibers, polyacrylonitrile fibers, polyvinyl alcohol fibers, polyvinylchloride fibers, polyurea fibers, polyurethane fibers, polyfluorocarbon fibers, phenol fibers, cellulosic fibers, or the like.

Preferably the total percentage of the nonmetal fiber in the compound is from 30% to 80% by weight.

The elastomer in the compound of the present invention may be styrene-butadiene rubber (SBR), acrylonitrile-butadiene rubber (nitrile rubber, NBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymers (EVA), chlorinated polyethylene (CPE), chloroisobutane-isoprene rubber (CIIR), epichlorohydrin rubber (ECO), nitrile isoprene rubber (NIR) or the like. Elastomers other than rubbers may also be used.

The filler in the compound of the present invention may be either an inorganic filler or organic filler. However, when an organic filler is used, the heat resisting properties of the anti-squeal shim, in general, will be deteriorated. Accordingly, it is preferable to use an inorganic filler such as clay, talc, barium sulfate, sodium bicarbonate, graphite, lead sulfate, tripoli, wollastonite, or the like.

Preferably the compound contains 2 to 5% small pieces of cork by weight. If the percentage of cork is less than 2%, the effect of the addition of the cork cannot be obtained sufficiently. On the other hand, if the percentage of cork is more than 5%, it is likely to lead to a decrease of the bonding strength between the nonmetal fiber and the elastomer in the compound layer, because the apparent density of cork is very small and even a small weight of cork has large surface area.

Preferably diameters of the small pieces of cork are 0.5 mm or less so as to increase the smoothness of the compound layer surface and the dispersibility of the cork pieces or grains into the compound.

In case the compound is applied only to one side of the metal plate, preferably the thickness of the compound layer is selected to be from 200 to 800 microns. When the compound layer is thinner than 200 microns, satisfactory vibration damping properties cannot be obtained, while when it is thicker than 800 microns, a stress relaxation or setting is liable to occur in the compound layer.

The present invention will hereunder be described in conjunction with a preferred embodiment of the invention that is shown in the drawings.

FIGS. 1 through 3 show an anti-squeal shim 1 used in one embodiment of the present invention. The anti-squeal shim 1 is made as follows. First, a stainless steel (JIS SUS301) plate 3 is coated only on one face thereof with a heat resisting adhesive 17 (see FIG. 3). Then the face of the stainless steel plate 3 is further coated with a compound layer 2 having the composition mentioned below.
(Composition of the compound)
  (i) Glass fiber . . . 40% by weight
  (ii) Fibrillated aromatic polyamide fiber
    (Trade name "Kevlar Pulp" manufactured by Du pont) . . . 6% by weight
  (iii) Nitrile rubber (NBR) . . . 20% by weight
  (iv) Rubber agent . . . 5% by weight
  (v) Inorganic filler . . . 10% by weight
  (Vi) Grains of cork . . . 3% by weight
  (Vii) Carbon . . . 16% by weight For the above compound, the glass fiber that is selected is a heat resisting inorganic fiber, and the fibrillated aromatic polyamide fiber that is selected is a heat resisting organic fiber.

The apparent density of the cork is about 0.06 g/cm$^3$ and that of the glass fiber is 2.7 g/cm$^3$. Therefore, though the weight of the grains of cork is 3% of that of the compound, the volume of the grains of cork is about three times that of the glass fiber.

The carbon is added as a coloring agent, but not as a filler.

The rubber agent may be a vulcanizing agent such as sulfur, zinc oxide, magnesium oxide, peroxide, dinitrobenzene, or the like, or a vulcanization accelerator such as thiazole compounds, polyamine compounds, sulfenamide compounds, dithiocarbamate compounds, aldehydeamine compounds, guanidine compounds, thiourea compounds, xanthate compounds, or the like.

The inorganic filler may be talc, barium sulfate, sodium bicarbonate, graphite, lead sulfate, tripoli, wollastonite, or the like.

The surface of the compound layer 2 is coated with a layer 4, hereinafter referred to as graphite layer, of which a principal component is graphite. Thereafter, a heat treatment is applied to the compound layer 2 and the graphite layer 4 in a temperature range of from 140° C. to 160° C. for 30 to 40 minutes. This heat treatment is performed in order to provide for a cross-linking of the rubber in the compound layer 2 and a cross-linking of a synthetic resin which is mixed into the graphite layer 4. The synthetic resin is added to the graphite layer 4 so as to enable the graphite layer 4 to be applied to the compound layer 2, because graphite by itself cannot be applied to the compound layer 2. The graphite layer 4 are provided to decrease the coefficient of friction of the compound layer 2 surface.

A thickness of the stainless steel plate 3 is 0.4 mm (400 microns), that of the compound layer 2 is 600 microns and that of the graphite layer 4 is from 2 to 3 microns.

The anti-squeal shim 1 is provided with an appropriate number of relatively long and narrow holes 5 therethrough. A pair of upper hooks 6 are formed at the upper end of the anti-squeal shim 1 by bending tongue portions integrally formed at the upper end of the stainless steel plate 3. A lower hook 15 is formed at the lower end of the anti-squeal shim 1 by bending a tongue portion integrally formed at the lower end of the stainless steel plate 3.

Figure 4:
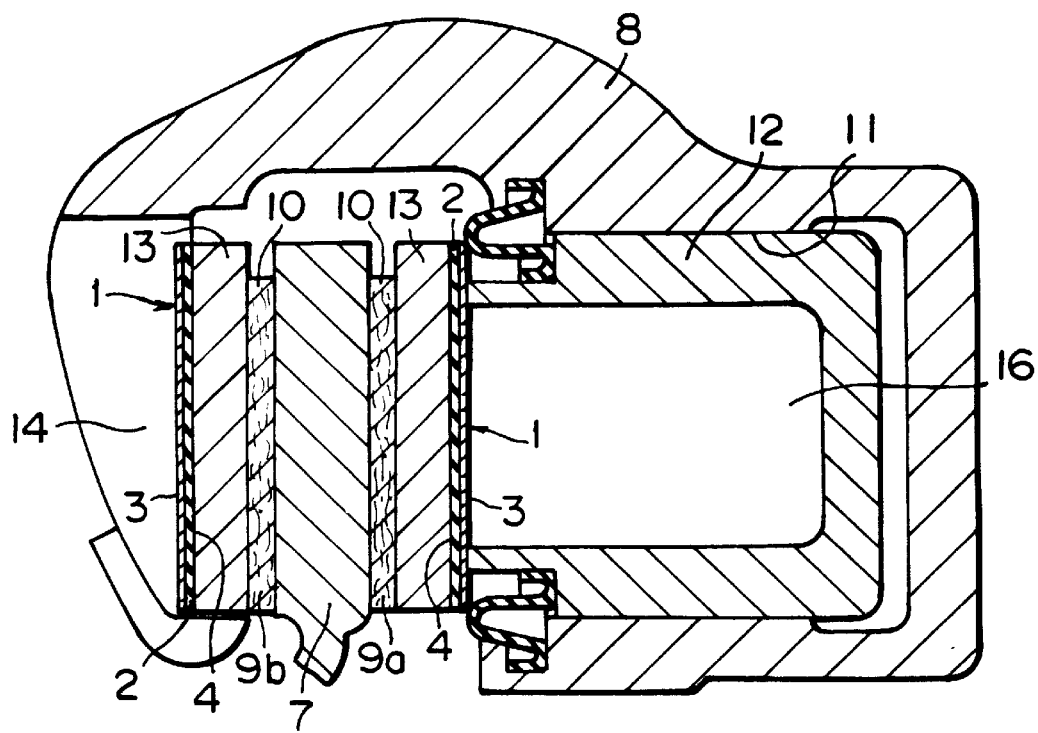
FIG. 4 is a cross sectional view of a disc brake equipped with the anti-squeal shim.

FIG. 4 shows one embodiment of a disc brake equipped with a pair of the anti-squeal shims 1. The disc brake includes a disc rotor 7 rotating with a wheel of a vehicle, not shown, and a caliper 8 supported by a fixed member of the vehicle and straddling the periphery of the disc rotor 7 so as to be movable in a direction parallel to the axis of the disc rotor 7. Inboard and outboard friction pads 9a and 9b are positioned on either side of the disc rotor 7. Each of the friction pads 9a and 9b has a backing plate 13 and a friction member 10 secured to the disc rotor side of the backing plate 13.

Figure 5:
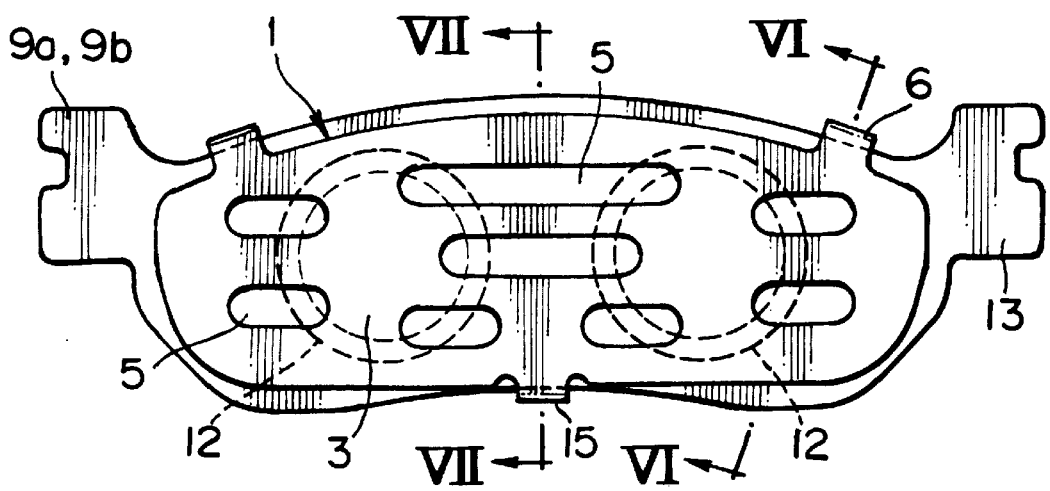
FIG. 5 is a rear view of a friction pad incorporated in the disc brake and the anti-squeal shim mounted on the friction pad.
Figure 6:
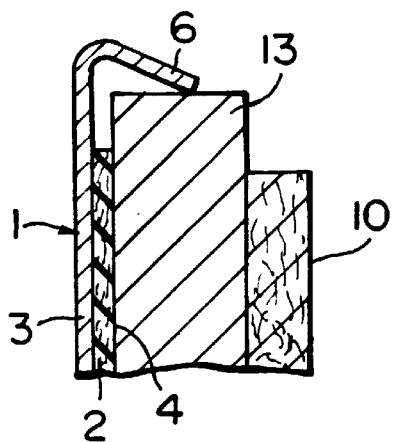
FIG. 6 is an enlarged cross sectional view of upper parts of the friction pad and the anti-squeal shim taken along the line VI—VI of FIG. 5 showing that an upper hook of the anti-squeal shim is engaged with the upper part of the friction pad.
Figure 7:
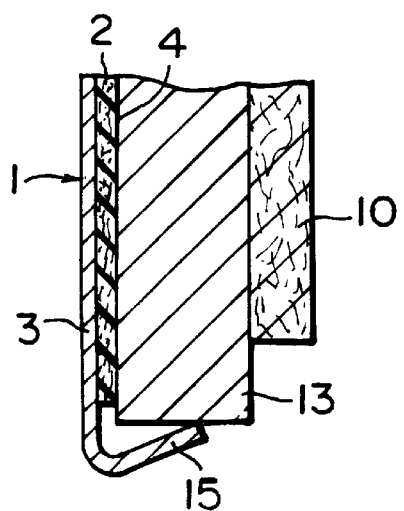
FIG. 7 is an enlarged cross sectional view of lower parts of the friction pad and the anti-squeal shim taken along the line VII—VII of FIG. 5 showing that a lower hook of the anti-squeal shim is engaged with the lower part of the friction pad.

The caliper 8 is provided with a pair of cylindrical bores 11 in one side thereof parallel to the axis of the rotor 7. Each cylindrical bore 11 slidably receives a brake piston 12 having a hollow configuration with a central bore 16, the open end of which piston 12 being opposed to the backing plate 13 of the inboard friction pad 9a. One of the anti-squeal shim 1, hereinafter referred to as inboard anti-squeal shim, is interposed between the pistons 12 and the backing plate 13 of the inboard friction pad 9a with the stainless steel plate 3 thereof opposed to the pistons 12 and with the compound layer 2 thereof opposed to the backing plate 13. Thus, the stainless steel plate 3 side of the inboard anti-squeal shim 1 is directly opposed to the open ends of the pistons 12 without intervention of a backing-up shim, unlike conventional disc brakes. In such arrangement, as shown in FIGS. 5 through 7, the inboard anti-squeal shim 1 is mounted on the backing plate 13 by engaging the upper hooks 6 and lower hook 15 thereof with the backing plate 13 of the inboard friction pad 9a. As shown in FIG. 5, the open end of each piston 12 that has an annular shape lies across the holes 5.

The caliper 8 is provided, at the other end side, with a finger 14 opposed to the backing plate 13 of the outboard friction pad 9b. The other anti-squeal shim 1, hereinafter referred to as outboard anti-squeal shim, is interposed between the caliper finger 14 and the backing plate 13 of the outboard friction pad 9b with the stainless steel plate 3 opposed to the caliper finger 14 and with the compound layer 2 opposed to the backing plate 13. Thus, the outboard anti-squeal shim 1 is directly opposed to the caliper finger 14 without intervention of a backing-up shim, unlike conventional disc brakes. The outboard anti-squeal shim 1 is mounted on the backing plate 13 of the outboard friction pad 9b by engaging the upper hooks 6 and lower hook 15 thereof with the backing plate 13 as shown in FIGS. 5 through 7.

Upon application of a brake fluid pressure to the cylindrical bore 11, the piston 12 is moved toward the disc rotor 7 (leftward in FIG. 4) to urge the inboard friction pad 9a against the inboard side of the disc rotor 7 through the inboard anti-squeal shim 1, while by the reaction to the pistons 12 movement, the caliper 8 is moved toward the opposite direction (rightward in FIG. 4), causing the caliper finger 14 to urge the outboard friction pad 9b against the outboard side of the disc rotor 7 through the outboard anti-squeal shim 1.

Table 1 shows a comparison of effects of reducing the brake squeal by the anti-squeal shims 1 of the above-mentioned embodiment, a conventional anti-squeal shim and comparative examples. The conventional anti-squeal shim comprises a steel plate of 0.4 mm thick, rubber layers each formed solely of a synthetic rubber and each applied to the both sides of the steel plate to a thickness of 100 microns, and graphite layers, of which principal component is graphite, each applied to the surfaces of the compound layers. It should be noted that, only with this conventional anti-squeal shim, the noise generation rate and the noise coefficient were measured with backing-up shims interposed between the inboard anti-squeal shim and the piston 12 and between the outboard anti-squeal shim and the caliper finger 14.

The anti-squeal shims of the comparative examples A, B and C comprise a stainless steel plate (JIS SUS301) of 0.6 mm thick, a compound layer applied to only the one side of the steel plate to a thickness of 300 microns, and a graphite layer, of which principal component is graphite, applied to the surface of the compound layer, respectively. The compound consists of a glass fiber, a fibrillated aromatic polyamide fiber (Trade name "Kevlar Pulp" manufactured by Du pont), a nitrile rubber (NBR), a rubber agent and an inorganic filler, and does not include small pieces of cork. The comparative examples A, B and C contain 50%, 20% and 13% NBR, or elastomer, 50%, 80% and 87% fibers and filler, respectively by weight.

TABLE 1

| Specimen | Compound composition | | Squeal reducing effect | |
|---|---|---|---|---|
| | Elastomer | Fibers and filler | Noise generation rate (%) | Noise coefficient |
| Conventional shim | 100% | 0% | 44.4 | 515.2 |
| Comp. example A | 50% | 50% | 26.7 | 403.4 |
| Comp. example B | 20% | 80% | 21.5 | 149.6 |
| Comp. example C | 13% | 87% | 14.9 | 40.0 |
| Embodiment | Compound with cork grains | | 5.2 | 11.6 |

As is seen from Table 1, the conventional anti-squeal shim coated with the rubber only layers that do not include a fiber and filler presents a high noise generation rate and a high noise coefficient, which means that the conventional anti-squeal shim is not efficient in reducing the brake squeal. The comparative examples A, B and C coated with the compound layer that includes fibers and a filler present lower noise generation rates and noise coefficients than those of the conventional anti-squeal shim. Particularly, the more the percentage of the fibers and filler is, the lower the noise generation rate and noise coefficient become. However, as the percentage of the nonmetal fibers and the filler is increased, the percentage of the elastomer is inversely decreased, causing the bonding strength between the nonmetal fibers and the elastomer in the compound layer to be reduced so that separations between the elastomer and the nonmetal fibers are apt to occur in the compound layer.

The anti-squeal shim 1 of the embodiment presents a noise generation rate and noise coefficient which are much smaller than those of the comparative example C which has the least percentage of the fibers and filler of all the comparative examples. With this anti-squeal shim 1, since it is not necessary to decrease considerably the percentage of the elastomer, separations between the elastomer and the nonmetal fibers in the compound layer can be obviated during a punching process or the like in the manufacturing process.

Besides, since the anti-squeal shims 1 has the compound layer 2 including the nonmetal fibers, the elastomer, the grains of cork and the filler, a stress relaxation or setting is hard to occur even if the compound layer 2 is thickened. Consequently, even with the stainless steel plate 3 coated only on one face thereof with the compound layer 2, satisfactory vibration damping properties can be obtained provided the compound layer 2 is sufficiently thick, and thereby the brake squeal can be prevented effectively. Therefore, it is not necessary to coat the piston 12 side face of the stainless steel plate 3 of the inboard anti-squeal shim 1 and the caliper finger 14 side face of the stainless steel plate 3 of the outboard anti-squeal shim 1 with the compound layers 2 and thereby backing-up shims are not necessary, unlike conventional anti-squeal shims.

If the frictional heat generated between the friction pads 9a and 9b and the disc rotor 7 was not insulated well, it would transfer to the brake fluid in the cylindrical bore 11 through the friction pads 9a and 9b, the anti-squeal shims 1 and the pistons 12, and there would be fear of causing a "vapor lock phenomenon" where the brake refuses to work.

However, since the compound layers 2 of inboard and outboard shims 1 include grains of cork together with the nonmetal fibers, the heat insulating properties thereof is much better than those of a rubber alone layer, and thereby the heat transfer from the friction pads 9a and 9b to the brake fluid in the cylindrical bore 11 through the anti-squeal shims 1 can be decreased and the reliability of the hydraulic system of the disc brake can be improved.

Further, since a backing-up shim is not necessary, the holes 5 are not closed by the backing-up shim and are allowed to limit the heat transmission paths of the disc brake. At the same time, the holes 5 form air passages which are open to the contact between the anti-squeal shims 1 and the pistons 12 or the caliper finger 14, causing air flows therethrough to make heat radiation efficiently. Consequently, the heat insulating effect is further improved and the heat transfer to the brake fluid is decreased, causing the reliability of the disc brake to be improved.

Though in the aforementioned embodiment the anti-squeal shims 1 are provided with holes 5, the anti-squeal shim may be provided with recesses at the periphery thereof in place of the holes or together with the holes.

Though the aforementioned embodiment is applied to a movable caliper type disc brake, the present invention may be applied to other types of disc brakes.

Though, in the aforementioned embodiment, the metal plate 3 is coated only on one side thereof with the compound layer to dispense with a backing-up shim, in the present invention, the metal plate of the anti-squeal shim may be coated to both sides thereof with the compound layers and the anti-squeal shim may be used in combination with a backing-up shim.

Although preferred embodiment of the present invention has been shown and described herein, it should be apparent that the present disclosure is made by way of example only and that variations thereto are possible within the scope of the disclosure without departing from the subject matter coming within the scope of the following claims and a reasonable equivalency thereof.

What is claimed is:

1. An anti-squeal shim to be interposed between a forcing member that urges a friction pad against a disc rotor and a backing plate of said friction pad in a disc brake, said anti-squeal shim comprising:
    a metal plate; and
    a compound layer applied to at least one side of said metal plate, and
    said compound layer includes an elastomer, a filler, small pieces of cork, and a nonmetal fiber other than asbestos; and
    wherein said compound layer contains 2 to 5% of said small pieces of cork by weight.

2. An anti-squeal shim as set forth in claim 1, wherein diameters of said small pieces of cork are 0.5 mm or less.

3. An anti-squeal shim as set forth in claim 1, wherein said compound layer is applied only to one side of said metal plate.

4. An anti-squeal shim as set forth in claim 1, wherein a thickness of said compound layer being from 200 to 800 microns.

5. An anti-squeal shim as set forth in claim 1, further comprising a hole provided therethrough to form an air passage that is open to a contact area between said anti-squeal shim and said forcing member.

6. An anti-squeal shim as set forth in claim 1, further comprising a layer of which a principal component is graphite, which layer being applied to a surface of said compound layer.

7. A disc brake comprising:
    a disc rotor rotating with a wheel of an automotive vehicle;
    a pair of friction pads positioned on opposite sides of said disc rotor so as to be movable toward and away from the opposite sides of said disc rotor, said friction pads each having a backing plate and a friction member secured to said disc rotor side of said backing plate;
    a hydraulic actuating means urging said friction pads through forcing members against the opposite sides of said disc rotor to restrain a rotation of said disc rotor; and
    an anti-squeal shim including a metal plate and a compound layer applied on only one side of said metal plate, said compound layer including an elastomer, a filler, small pieces of cork, and a nonmetal fiber other than asbestos; and
    said anti-squeal shim being interposed between said forcing member and said backing plate with said metal plate opposed to said forcing member without intervention of a backing-up shim and with said compound layer opposed to said backing plate; and
    wherein said compound layer contains 2 to 5% said small pieces of cork by weight.

8. A disc brake as set forth in claim 7, wherein a thickness of said compound layer being from 200 to 800 microns.

9. A disc brake as set forth in claim 7, further comprising a hole provided through said anti-squeal shim to form an air passage open to a contact area between said anti-squeal shims and said forcing member.

10. A disc brake as set forth in claim 7, further comprising a layer of which a principal component is graphite, said layer being applied to a surface of said compound layer.

11. A disc brake as set forth in claim 7, wherein one of said forcing member is a piston having a hollow configuration with a central bore.

* * * * *